United States Patent [19]

Mangan

[11] 3,945,584

[45] Mar. 23, 1976

[54] FILM CASSETTES

[75] Inventor: Clifford Mangan, Ilford, England

[73] Assignee: Ilford Limited, Essex, England

[22] Filed: Apr. 25, 1974

[21] Appl. No.: 464,613

[30] Foreign Application Priority Data

May 16, 1973 United Kingdom ............... 23347/73
May 16, 1973 United Kingdom ............... 23350/73

[52] U.S. Cl. ............................ 242/71.1; 242/71.7
[51] Int. Cl.² ............................ G03B 1/04
[58] Field of Search .................. 242/71.1, 71.7, 71; 287/52.07

[56] References Cited

UNITED STATES PATENTS

| | | | |
|---|---|---|---|
| 2,476,996 | 7/1949 | Nebel | 242/71.1 |
| 3,104,846 | 9/1963 | Ringle | 242/71.1 |
| 3,128,058 | 4/1964 | Ringle | 242/71.1 |

FOREIGN PATENTS OR APPLICATIONS

| | | | |
|---|---|---|---|
| 970,172 | 8/1958 | Germany | 242/71.7 |
| 252,860 | 7/1970 | U.S.S.R. | 242/71.1 |

*Primary Examiner*—Edward J. McCarthy
*Attorney, Agent, or Firm*—Wenderoth, Lind & Ponack

[57] ABSTRACT

Cassette for a spool of photographic film, having a pair of lips through which the leading end of a roll of photographic film located in the cassette protrudes, the pair of lips consisting of an upper extended lip and a lower co-acting lip, the pair of lips leading to an internal extended peripheral slot through which the film is to be led, the slot consisting of an upper and a lower channel member, each channel member having an outer portion and a inner curved portion, the inner curved portion of the upper channel member forming part of the wall of the cylindrical cassette, the outer portion of the pair of lips being set at an angle to the cylindrical body of the cassette so as to constitute a tangent to a concentric circle which has a diameter of less than 0.8 of the internal diameter of the cylindrical cassette.

31 Claims, 3 Drawing Figures

FILM CASSETTES

BACKGROUND OF THE INVENTION

THIS invention relates to cassettes for photographic film material mounted on a spool.

Cassettes of this type, which find particular use in 35 mm cameras, are light tight so that they can be placed into and removed from a camera in the light. The cassette has a pair of lips through which the leading edge of the roll of film material protrudes. This leading edge is pulled out and fastened on to the take-up spool of the camera when loading the camera. It is important that light is not able to enter into the cassette through the lips of the cassette and in order to prevent the ingress of light the lips are usually lined internally with velvet or other such material. However the velvet or other such material which can be used prevent the ingress of light into the cassette is expensive and difficult to secure firmly in place within the lips of the cassette. Further dust or dirt particles are able to become entrapped in the velvet and these particles when so trapped will scratch any film material which is drawn over them. This happens particularly if the cassette is reloaded with film and re-used.

There is described in U.S. Pat. No. 3,128,058 a cassette which has a pair of lips which extend inwardly into the cassette to form a light labyrinth which traps the light and thus obviates the need to use a velvet light seal. However in this proposed cassette the labyrinth contains a number of steps and baffles which are required to prevent the ingress of light.

SUMMARY OF THE INVENTION

It is the object of the present invention to provide a film cassette which does not need to use velvet or like material in its lips and which has a light labyrinth which does not comprise steps or baffles and thus is easier to produce by injection moulding.

According to the present invention there is provided a cylindrical cassette for a spool photographic film, having a pair of lips through which the leading end of a roll of photographic film located in the cassette protrudes, the pair of lips consisting of an upper extended lip and a lower co-acting lip, the pair of lips leading to an internal extended peripheral slot through which the film is to be led, the slot consisting of an upper and a lower channel member, each channel member having an outer portion and a inner curved portion, the inner curved portion of the upper channel member forming part of the wall of the cylindrical cassette, the outer portion of the pair of lips being set at an angle to the cylindrical body of the cassette so as to constitute a tangent to a concentric circle which has a diameter of less than 0.8 of the internal diameter of the cylindrical cassette.

Suitably the cylindrical cassette is made of light-proof plastics material. Preferably the cylindrical light proof cassette comprises two semi-cylindrical body halves with integral end walls, the end walls being provided with semi-circular openings of a size suitable to receive the hub of a film spool and have overlapping interface surfaces and/or interfitting tongues and grooves. The hub of a film spool preferably has two flanges which abut the end walls of the cassette and thus serve to prevent ingress of light into the cassette.

Preferably the surface of the elongated slot over which the picture area of the film material is to pass has a matt surface. This is to minimise the effect of light reflection. If the cassette is made of a pigmented plastics material the matt surface area may have been produced by roughening the surface or produced in the moulding process. In such cases the matt area is preferably at a slightly lower level than the area of the slot which does not have a matt surface and which is to support the non-image area of the film material. Preferably the central area of the end of the lower channel member of the slot inside the cassette has been relieved so that the film from the hub inside the cassette touches only the edges of this channel.

The elongated slot constitutes a light labyrinth and allows substantially no light to enter the loaded cassette. No steps of light baffles in the labyrinth are required and no velvet or other materials are required to light seal the lips of the slot. However if the extended portion of the pair of lips is set at an angle to the cylindrical body of the cassette to constitute a tangent to a circle which has a diameter greater than 0.8 of the internal diameter of the cylindrical cassette, then light is able to enter the cassette.

preferably the extended portion of the pair of lips is set at an angle to the cylindrical body of the cassette to constitute a tangent to a concentric circle which has a diameter between 0.6 to 0.8 of the internal diameter of the cylindrical cassette. When it is less than 0.6 an increasingly greater effort is required to unwind the film from the hub in the cassette through the slot.

Preferably the material used for the construction of the cassette is a light-opaque easily mouldable thermoplastics material. Examples of such plastics material are polypropylene,polystyrene, a copolymer of acrylonitrile-butadiene-styrene, cellulose nitrate and cellulose acetate each of which have been heavily pigmented to render the material light-opaque. The preferred light-opaqueing pigment is carbon black. Another suitable opaqueing agent is titanium oxide which is preferably used together with a dye to render the plastics material a dark colour.

Most preferably the easily mouldable plastics material is polystyrene with a proportion e.g. 5% of a plastics material having low-friction characteristics. A particularly suitable plastics material of this type is polytetrafluorethylene. When a low friction plastics material is combined with an easily mouldable plastics material the pull required to unwind the film from the spool through the slot is very considerably reduced.

The invention also includes cassettes having an elongated slot as hereinbefore described loaded with a spool of photographic film material.

The cassette of the present invention preferably comprises only two body portions which when locked together form a cylindrical cassette.

Therefore in a preferred embodiment of the present invention there is provided a cassette for holding a spool loaded with a roll of photographic film material which has a pair of lips through which the leading end of a roll of photographic film located in the cassette protrudes and of the type which do not require velvet or like material in the lips or steps or baffles in the lips as hereinbefore described, which comprises two semi-cylindrical body members of opaque plastics material which members are provided with end walls having semi-circular opening adapted to receive the hub of a film spool having at each end a flange, each of which abuts an end wall of the two assembled body members, the bottom and side edges of the members having either overlapping extensions or interfitting tongues and grooves in order to render light-tight the assembled cassette, the end walls of the lips having interfitting tongues and grooves or overlapping extensions, each body member having at each end a semi-cylindrical axial extension of the body on which are present two lugs one at each end of the extension each of the lugs on one body member being adapted to co-act with the corresponding lugs on the other body member to form four pairs of locking means which hold the two body members locked together when the cassette is in the assembled state.

In this embodiment of the invention preferably at least two of the pairs of locking lugs which constitute the locking means for the cassette are a snap-fit locking means, that is to say the body members have to be flexed in order to engage these locking means. Preferably the two pairs of locking lugs which constitute the locking means on the bottom of the cassette, that is to say away from the pair of lips, are rounded so that the lugs on one body member may be rolled by a pivoting action to fit into the co-acting lugs on the other body member.

Preferably the two pairs of lugs which constitute the locking means at the top of the cassette, that is to say adjacent to the pair of lips, are a snap-fit locking means.

When the bottom pair of lugs are rounded and the top pair of lugs are snap fit the cassette is assembled by first engaging the bottom pair of lugs and then flexing the body members to cause the snap-fit pair of lugs to lock together.

Preferably the bottom and side edges of each body member have overlapping extensions. Most preferably the overlapping extensions on the side and bottom edges on the member having the extended lip fit over the extensions on the side and bottom edges on the member having the co-acting lip so that this member fits partially into the member having the extended lip.

The spool having the roll of film which fits into the cassette has two flanges on the hub which abut the end walls of the two body members and thus serve to prevent the ingress of light into the cassette. The spool of film is loaded into the cassette before the two body members are assembled and the film leader is drawn out and placed on one slot member so that when the cassette is assembled it protrudes from the slot formed by the lips thus enabling the film to be unwound through the slot after the cassette has been assembled.

The cassette of this preferred embodiment of the present invention does not require any external means to enable the two body members to be held in assembled relation, i.e. no locking ring nor adhesive tape are required to ensure that the two members do not come apart when the cassette is being used.

The two body members may be assembled together with the spool holding the film either manually, automatically or semi-automatically. The two body members are of different shape because one has an extended lip and the other a co-acting lip, this helps to distinguish the body members in the dark.

DETAILED DESCRIPTION OF THE INVENTION

Figure 1:
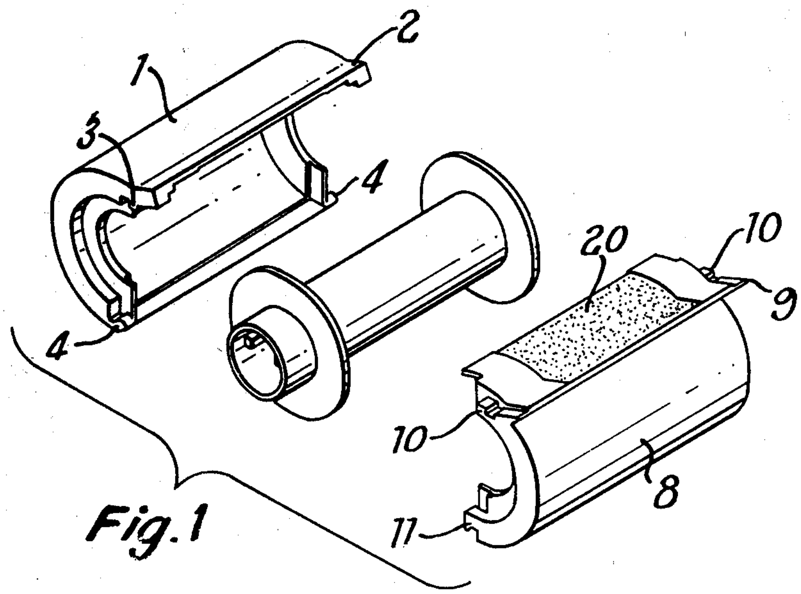
FIG. 1 is an exploded perspective view of the two halves which constitute the cassette in the preferred embodiment, a spool for photographic material being shown in between the two halves of the cassette.

In FIG. 1 the cassette comprises a half cassette 1 which has an extended lip 2. Placed on either end of the half cassette 1 adjacent to the extended lip 2 are two lugs 3. Remote from the side of the cassette with the lugs 3 are two lugs 4.

On the other half cassette 8 are two lugs 10 which are adapted to co-act with lugs 3 to form a snap fit and two rounded lugs 11 which are adapted to co-act with the lugs 4. The edges of the axial face of the half cassette 8 are recessed to fit behind the edges of the axial face on the half cassette 1.

There is also shown on the half cassette 8 a peripheral extended portion 20. The extended portion 20 together with the extended lip 2 and the co-acting lip 9 constitute a light labyrinth. This is shown more clearly in FIG. 2 in which the same numbers have the same signification portion 20 preferably has a roughened or mat surface (shown by the stippled area in FIG. 1) which is lower than the remainder of portion 20.

Figure 2:
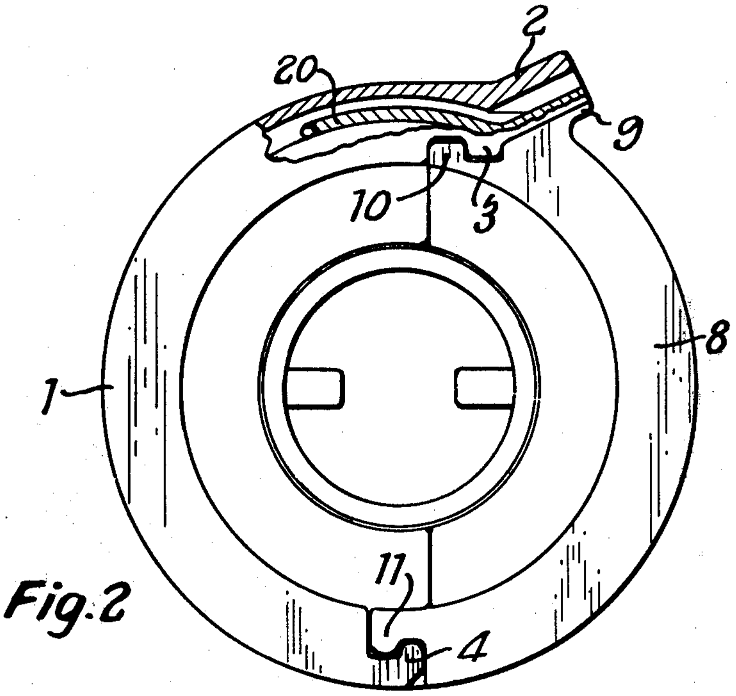
FIG. 2 is a sectional side elevation of the cassette of the present invention, the two halves having been joined together.

In FIG. 2 it is shown that the inner curved portion of the upper channel member of the labyrinth is part of the wall of the cylindrical cassette.

Figure 3:
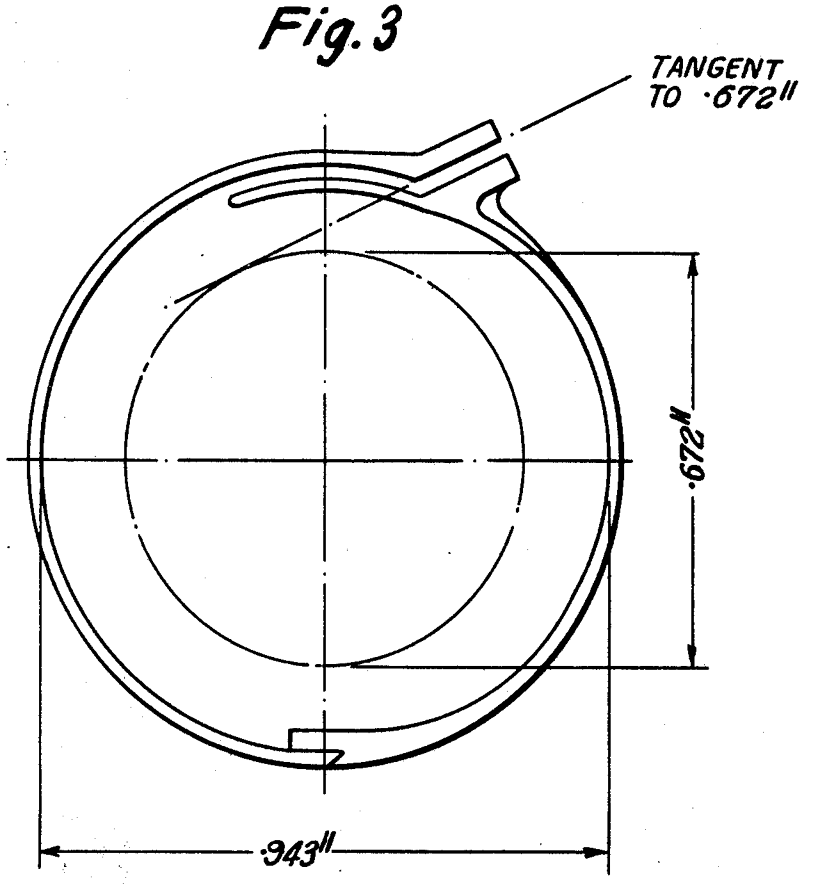
FIG. 3 shows possible actual dimensions of the cassette of FIG. 2 in the scale 4:1.

In FIG. 3 there is shown one particular cassette which was made of polystyrene pigmented with carbon black so as to be light opaque. The internal diameter D of the cylindrical cassette is 0.943 inches (23.95 mm).

The extended lip 2 is set at an angle to the cylindrical body of the cassette so as to constitute a tangent to a concentric circle which had a diameter $d$ of 0.672 inches (17.07 mm). This is less than 0.8 of the internal diameter of the cylindrical cassette.

In FIG. 2 the two halves of the cassette 1 and 8 are shown joined together. The cassette is held together by the four pairs of lugs, there being a similar pair to lugs 4 and 11 at the other side of the cassette and a similar pair to lugs 3 and 10 at the other side of the cassette. When these four pairs have been fitted together, the top pair in each case being snapped together, the cassette remains as a unitary body and will not come apart unless considerable force is used to separate the two halves.

I claim:

1. A cylindrical cassette for a spool of photographic film, said cassette including a pair of lips through which the leading end of a roll of photographic film located in the cassette protrudes, said pair of lips comprising an upper extended lip and a lower co-acting lip, said pair of lips leading to an internal extended peripheral slot through which the film is to be led, the slot consisting of upper and lower channel members, each channel member having a outer portion and a inner curved portion, the inner curved portion of the upper channel member forming part of the wall of the cylindrical cassette, the extended portion of the pair of lips being set at an angle to the cylindrical body of the cassette so as to constitute a tangent to a concentric circle which has a diameter of less than 0.8 of the internal diameter of the cylindrical cassette.

2. A cassette according to claim 1 wherein the extended portion of the pair of lips is set at an angle to the cylindrical body of the cassette to constitute a tangent to a concentric circle which has a diameter between 0.6 to 0.8 of the internal diameter of the cylindrical cassette.

3. A cassette according to claim 1 which comprises two semi-cylindrical body halves with integral end walls, the end walls being provided with semi-circular openings of a size suitable to receive the hub of a film spool and have overlapping interface surfaces having interfitting tongues and grooves.

4. A cassette according to claim 3 wherein the hub of the film spool has two flanges which abut the end walls of the cassette.

5. A cassette according to claim 1 wherein the surface of the elongated slot over which the picture area of the film material is to pass has a matt surface.

6. A cassette according to claim 5 wherein the matt area is at a lower level than that part of the slot which does not have a matt surface.

7. A cassette according to claim 1 wherein the central area of the end of the lower channel member of the slot inside the cassette is relieved so that the film from the hub inside the cassette touches only the edges of the lower channel member.

8. A cassette according to claim 1 which is composed of a light-opaque plastics material.

9. A cassette according to claim 8 wherein the plastics material is polypropylene, polystyrene, a copolymer of acrylonitrile-butadiene-styrene, cellulose nitrate or cellulose acetate, each of which have been heavily pigmented to render the plastics material light-opaque.

10. A cassette according to claim 9 wherein the opaqueing pigment is carbon black.

11. A cassette according to claim 10 wherein the plastics material is polystyrene containing 5% polytetrafluorethylene.

12. A cassette according to claim 8 which comprises two semi-cylindrical body members of opaque plastics material which members are provided with end walls each having a semi-circular opening adapted to receive the hub of a film spool having at each end a flange, each of which abuts an end wall of the two assembled body members, the bottom and side edges of the said members having interfitting tongues and grooves in order to render light-tight the assembled cassette, the end walls of the lips having interfitting tongues and grooves or each body member having at each end a semi-cylindrical axial extension of the body on which are present two lugs one at each end of the extension, each of said lugs on one body member being adapted to co-act with the corresponding lugs on the other body member to form four pairs of locking means which hold the two body members locked together when the cassette is in the assembled state.

13. A cassette according to claim 12 wherein at least two of the pairs of locking lugs are a snap-fit locking means.

14. A cassette according to claim 12 wherein the two pairs of locking lugs which constitute the locking means on the bottom of the cassette, are rounded so that the lugs on one body member may be rolled by a pivoting action to fit into the co-acting lugs on the other body member.

15. A cassette according to claim 14 wherein the two pairs of lugs which constitute the locking means at the top of the cassette are a snap-fit.

16. A cassette according to claim 15 wherein the bottom and end walls of each body member have overlapping extensions.

17. A cassette according to claim 16 wherein the overlapping extensions on the side end walls on the member having the extended lip fit over the extensions on the side and end walls on the member having the co-acting lip so that such member fits partially into the member having the extended lip.

18. A light proof film cassette which comprises a film spool in a casing which comprises two semi-cylindrical body members of opaque plastics material, which members are provided with end walls having semi-circular openings adapted to receive the hub of a film spool having at each end a flange, each of which abuts an end wall of the two assembled body members, the bottom and side edges of the said members having interlocking means to render light-tight the assembled cassette, one of said members having an extended lip and the other a co-acting lip, the lips forming a narrow slot for the passage of the film from the spool out of the cassette, the end walls of said lips having interfitting members, each body member having at each end a semi-cylindrical axial extension of the body on which are present two lugs, one at each end of the extension, each of said lugs on one body member being adapted to co-act with the corresponding lugs on the other body member to form four pairs of locking means which hold the two body members locked together when the cassette is in the assembled state.

19. A cassette according to claim 18 wherein at least two of the pairs of locking lugs which constitute the locking means for the cassette are a snap-fit locking means.

20. A cassette according to claim 18 wherein the two pairs of locking lugs which constitute the locking means on the bottom of the cassette, that is to say away from the pair of lips, are rounded so that the lugs on one body member may be rolled by a pivoting action to fit into the co-acting lugs on the other body member.

21. A cassette according to claim 20 wherein the two pairs of lugs which constitute the locking means at the top of the cassette adjacent to the pair of lips are a snap-fit locking means.

22. A cassette according to claim 18 wherein the bottom and side edges of the body members have overlapping extensions.

23. A cassette according to claim 22 wherein the interlocking means on the side and bottom edges on the body member having the extended lip comprise overlapping extensions fitting over extensions forming the interlocking means on the side and end walls on the member having the co-acting lip so that this latter member fits partially into the casing member having the extended lip.

24. A cassette according to claim 18 wherein the material of construction therefore is polypropylene, polystyrene, a copolymer of acrylonitrile-butadiene-styrene, cellulose nitrate or cellulose acetate each of which have been heavily pigmented to render the material light-opaque.

25. A cassette according to claim 24 wherein the light-opaqueing pigment is carbon black.

26. A cassette according to claim 18 wherein the material of construction is polystyrene with 5% of polytetrafluorethylene.

27. A cassette according to claim 18 wherein the slot through which the film is led leads to an internal extended peripheral slot which consists of an upper and a lower channel member, each channel member having an outer portion and an inner curved portion, the inner curved portion of the upper channel member forming part of the wall of the cylindrical cassette, the extended portion of the pair of lips being set an angle to the cylindrical body of the cassette so as to constitute a tangent to a concentric circle which has a diameter of less than 0.8 of the internal diameter of the cylindrical cassette.

28. A cassette according to claim 27 wherein the surface of the elongated slot over which the picture area of the film material is to pass has a matt surface.

29. A cassette according to claim 28 wherein the matt area is at a lower level than the area of the slot which does not have a matt surface.

30. A cassette according to claim 27 wherein the central area of the end of the lower channel member of the slot inside the cassette is relieved.

31. A cassette according to claim 27 wherein the extended portion of the pair of lips is set at an angle to the cylindrical body of the cassette to constitute a tangent to a concentric circle which has a diameter between 0.6 to 0.8 of the internal diameter of the cylindrical cassette.

* * * * *